US011545664B2

(12) United States Patent
Lee et al.

(10) Patent No.: US 11,545,664 B2
(45) Date of Patent: Jan. 3, 2023

(54) ANODE ACTIVE MATERIAL FOR LITHIUM SECONDARY BATTERY, METHOD OF MANUFACTURING SAME AND LITHIUM SECONDARY BATTERY COMPRISING SAME

(71) Applicant: KNU-Industry Cooperation Foundation, Chuncheon-si (KR)

(72) Inventors: Sung Man Lee, Chuncheon-si (KR); Ki Hoon Kim, Guri-si (KR)

(73) Assignee: KNU-Industry Cooperation Foundation, Chuncheon-si (KR)

( * ) Notice: Subject to any disclaimer, the term of this patent is extended or adjusted under 35 U.S.C. 154(b) by 196 days.

(21) Appl. No.: 16/710,452

(22) Filed: Dec. 11, 2019

(65) Prior Publication Data

US 2020/0185720 A1    Jun. 11, 2020

(30) Foreign Application Priority Data

Dec. 11, 2018  (KR) .................. 10-2018-0159047

(51) Int. Cl.
*H01B 1/04* (2006.01)
*H01M 4/587* (2010.01)
(Continued)

(52) U.S. Cl.
CPC ............. *H01M 4/587* (2013.01); *C01B 32/23* (2017.08); *H01B 1/04* (2013.01); *H01M 4/366* (2013.01);
(Continued)

(58) Field of Classification Search
CPC . H01B 1/00; H01B 1/04; H01M 4/625; C01B 32/15; C01B 32/20
See application file for complete search history.

(56) References Cited

U.S. PATENT DOCUMENTS

| 8,753,778 | B2 * | 6/2014 | Lee | .................. | C01B 32/21 |
| | | | | | 429/231 |
| 9,368,792 | B2 * | 6/2016 | Lee | .................. | H01M 4/133 |
| 2008/0044656 | A1 * | 2/2008 | Ko | .................. | H01M 4/587 |
| | | | | | 252/502 |

FOREIGN PATENT DOCUMENTS

EP          2913299 A1 *  9/2015
KR     10-2003-0087986 A    11/2003
(Continued)

OTHER PUBLICATIONS

Park et al "Modification for Improving the Electrochemical Performance of Spherically-Shaped Natural Graphite as Anode Material for Lithium-Ion Batteries", Journal of Thr Electrochemical Society, 163, (14) A3078-A3086 (2016).*
(Continued)

*Primary Examiner* — Mark Kopec
(74) *Attorney, Agent, or Firm* — Knobbe, Martens, Olson & Bear, LLP

(57) ABSTRACT

The present disclosure relates to an anode active material for a lithium secondary battery, a method of manufacturing the anode active material, and a lithium secondary battery including the anode active material. The anode active material includes natural graphite particles configured such that flaky natural graphite fragment particles having uneven (☐☐) surface defects are structured in a cabbage shape or at random and granulated, the surface and the inside of the natural graphite particles including a gap formed between the flaky natural graphite fragment particles, and a coating layer including amorphous or semicrystalline carbon formed on the surface of the flaky natural graphite fragment particles that form the gap and the surface of the natural graphite particles.

15 Claims, 5 Drawing Sheets

(51) Int. Cl.
    *C01B 32/20*         (2017.01)
    *C01B 32/23*         (2017.01)
    *H01M 4/36*          (2006.01)
    *H01M 10/0525*     (2010.01)
    *H01M 4/02*          (2006.01)

(52) U.S. Cl.
    CPC ..... *H01M 10/0525* (2013.01); *C01P 2002/82* (2013.01); *C01P 2004/03* (2013.01); *C01P 2004/61* (2013.01); *C01P 2006/40* (2013.01); *H01M 2004/027* (2013.01)

(56) References Cited

FOREIGN PATENT DOCUMENTS

| KR | 10-2005-0009245 A | 1/2005 |
| KR | 10-0830612 B1 | 5/2008 |
| KR | 10-2009-0114130 A | 11/2009 |
| KR | 10-2011-0053027 A | 5/2011 |
| KR | 10-2013-0071070 A | 6/2013 |
| KR | 10-1365568 B1 | 2/2014 |
| KR | 10-2014-0029157 A | 3/2014 |
| KR | 10-1430733 B1 | 8/2014 |
| KR | 10-2018-0094747 A | 8/2018 |

OTHER PUBLICATIONS

Tsumura et al "Surface modification of natural graphite particles for lithium ion batteries", Solid State Ionics 135 (2000) 209-212.*
English language translation of KR 10-2018-0094747 (pub date Aug. 2018).*
English language translation of Notice of Final Rejection in priority application KR 10-2018-0159047 (action dated Mar. 2019).*

* cited by examiner

ANODE ACTIVE MATERIAL FOR LITHIUM SECONDARY BATTERY, METHOD OF MANUFACTURING SAME AND LITHIUM SECONDARY BATTERY COMPRISING SAME

CROSS REFERENCE TO RELATED APPLICATION

The present application claims priority based on Korean Patent Application No. 10-2018-0159047, filed on Dec. 11, 2018, the entire content of which is incorporated herein for all purposes by this reference.

BACKGROUND

1. Technical Field

The present invention relates to an anode active material for a lithium secondary battery, a method of manufacturing the anode active material, and a lithium secondary battery including the anode active material.

2. Description of the Related Art

Crystalline graphite materials are currently used as anode active materials for lithium secondary batteries. Crystalline graphite is classified into artificial graphite and natural graphite. Artificial graphite is usually obtained by heat-carbonizing a carbon precursor at a high temperature of about 2800° C. or more in an inert atmosphere to thus realize impurity removal and graphitization, and ultimately the manufacturing cost is high. Hence, the use of natural graphite has recently increased.

Currently commercially available natural graphite is spheroidized natural graphite, in which flaky natural graphite is granulated into a spherical shape. The spheroidized natural graphite particles are formed by structuring flaky natural graphite fragments in a cabbage shape or at random. However, the spheroidized natural graphite particles are configured such that flaky natural graphite fragments at the surface of the particles are granulated without a gap between the fragments, and thus contact thereof with the electrolyte is limited. When used as the anode active material for a lithium secondary battery, rapid charge and discharge characteristics are greatly deteriorated. In addition, during charging and discharging, it is difficult to effectively buffer the repeated expansion and contraction of graphite when repeating intercalation and deintercalation of lithium. As the structured state of the flaky graphite fragments becomes loose, structural stability of the spherically granulated particles may decrease, and moreover, during repeated charge and discharge, an irreversible reaction occurs with the electrolyte that penetrates inside, thus excessively forming a solid electrolyte interphase (SEI) film to thereby cause a swelling phenomenon, ultimately deteriorating cycle characteristics and high-rate charge and discharge characteristics.

With the goal of solving the problems, Korean Patent Nos. 10-1430733 and 10-1446698 disclose an anode active material for a lithium secondary battery, in which spheroidized natural graphite particles are subjected to sonication in an amorphous or semicrystalline carbon precursor solution and then to heat treatment for carbonization, whereby a gap is present between M the flaky natural graphite fragments at the surface portion of and inside the spheroidized natural graphite particles, the surface of the spheroidized natural graphite particles is coated with amorphous or semicrystalline carbon, and the amorphous or semicrystalline carbon is present in the gap so as to maintain the gap formed at the surface portion of and inside the spheroidized natural graphite particles.

However, there is still a need for the development of a high-capacity anode active material showing superior charge and discharge characteristics.

CITATION LIST

Patent Literature (Patent Document 1) Korean Patent No. 10-1430733 (Registration date: Aug. 8, 2014)
(Patent Document 2) Korean Patent No. 10-1446698 (Registration date: Sep. 25, 2014)
(Patent Document 3) Korean Patent No. 10-1126937 (Registration date: Mar. 7, 2012)
(Patent Document 4) Korean Patent Application Publication No. 10-2013-0071070 (Laid-open date: Jun. 28, 2013)
(Patent Document 5) Korean Patent No. 10-1002539 (Registration date: Dec. 13, 2010)

SUMMARY

Accordingly, an objective of the present invention is to provide an anode active material for a lithium secondary battery having superior high-rate charge and discharge characteristics and cycle life characteristics, a method of manufacturing the anode active material, and a lithium secondary battery including the anode active material.

In order to accomplish the above objective, an aspect of the present invention provides an anode active material for a lithium secondary battery, the anode active material including natural graphite particles configured such that flaky natural graphite fragment particles having uneven (□□) surface defects are structured in a cabbage shape or at random and granulated, the surface and the inside of the natural graphite particles including a gap formed between the flaky natural graphite fragment particles, and a coating layer including amorphous or semicrystalline carbon formed on the surface of the flaky natural graphite fragment particles that form the gap and the surface of the natural graphite particles.

Also, the amorphous or semicrystalline carbon may be included in an amount of 1 to 20 parts by weight based on 100 parts by weight of the natural graphite particles.

Also, the natural graphite particles may have an average particle diameter (D50) of 5 to 40 μm.

Another aspect of the present invention provides a method of manufacturing the anode active material, the method including: preparing a solution, including spheroidized natural graphite particles in which flaky natural graphite fragment particles are structured in a cabbage shape or at random and granulated, an amorphous or semicrystalline carbon precursor, an oxidizing agent, and a solvent; sonicating the solution, whereby a gap is formed between the flaky natural graphite fragment particles present at a surface of and inside the spheroidized natural graphite particles, uneven (□□) defects are formed on the surface of the flaky natural graphite fragment particles present at the surface of and inside the spheroidized natural graphite particles, and the surface of the flaky natural graphite fragment particles forming the gap and the surface of the spheroidized natural graphite particles are impregnated and coated with the amorphous or semicrystalline carbon precursor; drying the sonicated solution, thus manufacturing spheroidized-natural-graphite-modified particles; and heat-treating the spheroidized-natural-graphite-modified particles.

Also, carbon precursor may be at least one selected from the group consisting of citric acid, stearic acid, sucrose, polyvinylidene fluoride, a Pluronic block copolymer (Pluronic F127), carboxymethyl cellulose (CMC), hydroxypropyl cellulose, M regenerated cellulose, polyvinylpyrrolidone, tetrafluoroethylene, polyethylene, polypropylene, an ethylene-propylene-diene monomer (EPDM), sulfonated EPDM, starch, a phenol resin, a furan resin, furfuryl alcohol, polyacrylic acid, sodium polyacrylate, polyacrylonitrile, polyimide, an epoxy resin, cellulose, styrene, polyvinylalcohol, polyvinyl chloride, polyvinyl pyrrolidone, glycerol, polyol, a coal-based pitch, a petroleum-based pitch, a mesophase pitch, low-molecular-weight heavy oil, glucose, gelatin and sugars.

Also, the solvent may be at least one selected from the group consisting of water, N-methylpyrrolidone, dimethylformamide, toluene, ethylene, dimethylacetamide, acetone, methyl ethyl ketone, hexane, tetrahydrofuran, decane, ethanol, methanol, isopropanol, and ethyl acetate.

Also, the sonicating may be performed at a frequency of 10 to 35 kHz and an ultrasonic amplitude of 10 to 100 W for 1 min to 24 hr.

Also, the drying may be performed through at least one spray-drying process selected from among rotary spraying, nozzle spraying and ultrasonic spraying, a drying process using a rotary evaporator, a vacuum-drying process, or a natural drying process.

Also, the oxidizing agent may include at least one selected from among hydrogen peroxide ($H_2O_2$), nitric acid ($HNO_3$), sulfuric acid ($H_2SO_4$), potassium permanganate ($KMnO_4$) and sodium hydroxide (NaOH).

Also, the heat-treating may be performed at 500 to 3200° C.

Also, the heat-treating may be performed in an atmosphere containing nitrogen, argon, hydrogen or combinations thereof, or in a vacuum.

Also, the carbon precursor may be included in an amount of 2 to 80 parts by weight based on 100 parts by weight of the spheroidized natural graphite particles.

Still another aspect of the present invention provides a lithium secondary battery including the anode active material described above.

According to the present invention, the anode active material for a lithium secondary battery is capable of realizing a lithium secondary battery having superior high-rate charge and discharge characteristics and cycle life characteristics and high energy density.

DETAILED DESCRIPTION OF EMBODIMENTS

In the following description of the present invention, detailed descriptions of known functions and components incorporated herein will be omitted when it may make the subject matter of the present invention unclear.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, a detailed description will be given of the present invention.

Figure 1:
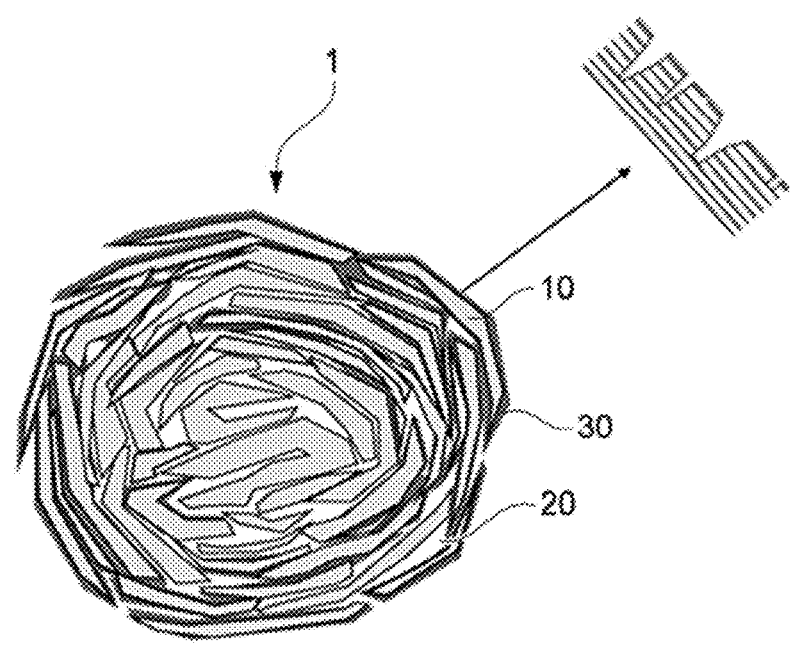
FIG. 1 shows a schematic cross-sectional view of an anode active material according to the present invention.

FIG. 1 is a schematic cross-sectional view showing the anode active material for a lithium secondary battery according to an embodiment of the present invention.

With reference to FIG. 1, the anode active material 1 includes natural graphite particles configured such that flaky natural graphite fragment particles 10 having uneven (□□) surface defects are structured in a cabbage shape or at random and granulated, the surface and the inside of the natural graphite particles including a gap 20 formed between the flaky natural graphite fragment particles, and a coating layer including amorphous or semicrystalline carbon 30 formed on the surface of the flaky natural graphite fragment particles that form the gap and on the surface of the natural graphite particles.

The flaky natural graphite fragment particles have uneven defects such as nanochannels, cavities, etc. in the surface thereof, and these defects are capable of additionally providing a lithium ion passage, thus further increasing high-rate charge and discharge characteristics of a lithium secondary battery during charging and discharging.

The uneven defects formed on the surface of the flaky natural graphite fragment particles may have a variety of shapes, depths, widths, and lengths of recesses thereof, and preferably have nano-scale dimensions.

Moreover, the amorphous or semicrystalline carbon is applied on the surface of the spheroidized natural graphite particles, and moreover, is present in the gap formed at the surface portion of and inside the spheroidized natural graphite particles. Furthermore, the amorphous or semicrystalline carbon is able to impede pressing of the spheroidized natural graphite particles due to the compression process during the manufacture of the anode, thus increasing the electrode density. Accordingly, because of high reactivity with the electrolyte even in the high-density electrode, the high-rate charge and discharge characteristics of the lithium secondary battery may be improved, and a lithium secondary battery having a high energy density may be realized.

Furthermore, the amorphous or semicrystalline carbon is not only applied on the surface of the spheroidized natural graphite particles but is also present in the gap formed at the surface portion of and inside the spheroidized natural graphite particles, whereby the flaky natural graphite fragments are linked to each other, making it possible to prevent the deterioration of structural stability of the spheroidized natural graphite particles, which may occur upon repeated charge and discharge, thereby improving cycle characteristics. The amorphous or semicrystalline carbon may be present in the gap formed at the surface portion of the spheroidized natural graphite particles, and may also be present in the gap inside the spheroidized natural graphite particles. Here, when the amorphous or semicrystalline carbon is present in the gap inside, it may include those present in the deep inside, that is, in or near the center of the spheroidized natural graphite particles. Due to these structural features, additional SEI film formation due to irreversible reaction with the electrolyte is suppressed even upon repeated charge and discharge cycles, thereby preventing the swelling of the spheroidized natural graphite particles. Accordingly, the volume expansion of the electrode is inhibited, ultimately making a greater contribution to improving the structural stability of the spheroidized natural graphite particles and cycle characteristics.

The amorphous or semicrystalline carbon may be included in an amount of 1 to 20 parts by weight, and particularly 2 to 15 parts by weight, based on 100 parts by weight of the natural graphite particles.

When the amorphous or semicrystalline carbon in the above amount range is applied on the surface of the natural graphite particles or is present in the gap formed at the surface portion thereof and inside, the gap between the flaky natural graphite fragments formed at the surface portion of and inside the natural graphite particles may be appropriately maintained, thus facilitating the diffusion of lithium ions and increasing electrical conductivity. Moreover, during repeated charge and discharge, additional SEI film formation due to irreversible reaction with the electrolyte is suppressed, thereby preventing swelling of the natural graphite particles and thus inhibiting volume expansion of the electrode, ultimately making a greater contribution to improving the structural stability of the spheroidized natural graphite particles and cycle characteristics.

The anode active material according to the present invention may be manufactured as follows.

Specifically, the method of manufacturing the anode active material may include preparing a solution including spheroidized natural graphite particles, in which flaky natural graphite fragment particles are structured in a cabbage shape or at random and granulated, an amorphous or semicrystalline carbon precursor, an oxidizing agent, and a solvent; sonicating the solution, thereby forming a gap between the flaky natural graphite fragment particles present at the surface of and inside the spheroidized natural graphite particles, forming uneven (□□) defects on the surface of the flaky natural graphite fragment particles present at the surface of and inside the spheroidized natural graphite particles, and impregnating and coating the surface or the flaky natural graphite fragment particles forming the gap and the surface of the spheroidized natural graphite particles with the amorphous or semicrystalline carbon precursor; drying the sonicated solution, thus manufacturing spheroidized-natural-graphite-modified particles; and heat-treating the spheroidized-natural-graphite-modified particles.

The spheroidized natural graphite particles may be formed through the method disclosed in Korean Patent Application Publication Nos. 2003-0087986 and 2005-0009245, but the present invention is not limited thereto. For example, flaky natural graphite having an average particle diameter of 30 μm or more may be repeatedly processed using a rotary processing machine, whereby the flaky natural graphite particles are granulated through grinding due to collision between the inner surface of the rotary processing machine and the flaky natural graphite powder, friction processing between powder particles, shear processing of powder due to shear stress, etc., ultimately manufacturing spheroidized natural graphite particles.

Accordingly, the spheroidized natural graphite particles may be formed in a manner in which the flaky natural graphite fragments are structured in a cabbage shape or at random and granulated. More preferably, the spheroidized natural graphite particles are configured such that the flaky natural graphite fragments are structured in a cabbage shape at the surface portion thereof and at random in the center thereof and granulated.

The spheroidized natural graphite particles may have a circular shape or an elliptical shape, and specifically, the spheroidized natural graphite particles may have a spherical shape with an index of about 0.8 or more, calculated by projecting three-dimensional natural graphite particles onto a two-dimensional plane.

The average particle diameter (D50) of the spheroidized natural graphite particles may fall in the range of 5 to 40 μm, and particularly 7 to 30 μm. Here, D50 refers to the average diameter of particles corresponding to a cumulative volume of 50 vol % in the particle size distribution. The use of spheroidized natural graphite particles having an average particle diameter within the above range is capable of facilitating processing, by which flaky natural graphite fragments are structured in a cabbage shape or at random and granulated, and improving electrochemical properties.

The amorphous or semicrystalline carbon precursor may include citric acid, stearic acid, sucrose, polyvinylidene fluoride, carboxymethyl cellulose (CMC), hydroxypropyl cellulose, regenerated cellulose, polyvinylpyrrolidone, tetrafluoroethylene, polyethylene, polypropylene, an ethylene-propylene-diene monomer (EPDM), sulfonated EPDM, starch, a phenol resin, a naphthalene resin, a polyvinyl alcohol resin, a furfuryl alcohol resin, glucose, gelatin, sugars, a polyacrylonitrile resin, a polyamide resin, a furan resin, a cellulose resin, a styrene resin, a polyimide resin, an epoxy resin, a vinyl chloride resin, a coal-based pitch, a petroleum-based pitch, polyvinylchloride, a mesophase pitch, tar, a block copolymer, polyol, low-molecular-weight heavy oil or combinations thereof.

When using polyol as the carbon precursor, at least one selected from among polyether polyol, polyester polyol, polytetramethylene ether glycol polyol, PHD (Polyharnstoff Dispersion) polyol, amine-modified polyol, Mannich polyol and mixtures thereof may be used.

The amorphous or semicrystalline carbon precursor may be included in an amount of 2 to 80 parts by weight, and particularly 5 to 50 parts by weight, based on 100 parts by weight of the spheroidized natural graphite particles. When the amount of the amorphous or semicrystalline carbon precursor falls within the above range, the amorphous or semicrystalline carbon may, appropriately, be present not only on the surface of the spheroidized natural graphite particles but also in the gap between the flaky natural graphite fragments at the surface portion of and inside the spheroidized natural graphite particles.

The solvent may include water, N-methylpyrrolidone, dimethylformamide, toluene, ethylene, dimethylacetamide, acetone, methyl ethyl ketone, hexane, tetrahydrofuran, decane, ethanol, methanol, isopropanol, ethyl acetate or combinations thereof.

The oxidizing agent may include, but is not limited to, hydrogen peroxide ($H_2O_2$), nitric acid ($HNO_3$), sulfuric acid ($H_2SO_4$), potassium permanganate ($KMnO_4$) or combinations thereof.

The sonication of the solution is capable of forming a gap between the structured flaky natural graphite fragments upon manufacture of the spheroidized natural graphite particles. In addition to the formation of the gap through sonication, defects may be formed on the surface of the flaky natural graphite fragments present at the surface portion of and inside the spheroidized natural graphite particles, the surface of the spheroidized natural graphite particles may be coated with the amorphous or semicrystalline carbon precursor, and the gap present at the surface portion of and inside the spheroidized natural graphite particles may be impregnated with the amorphous or semicrystalline carbon precursor.

The sonication may be performed under the following conditions.

The sonication may be carried out by applying ultrasonic waves at a frequency of 10 to 35 kHz and a power of 10 to 100 W for 1 min to 24 hr. The frequency is preferably 20 to 35 kHz, and more preferably 20 to 30 kHz, the power is preferably 15 to 70 W, and more preferably 20 to 60 W, and the sonication time is preferably 1 min to 10 hr, and more preferably 5 min to 2 hr. When sonication is performed under the above conditions, a gap may be formed between the flaky natural graphite fragments at the surface portion of and inside the spheroidized natural graphite particles, and moreover, defects may be formed on the surface of the flaky natural graphite fragments present at the surface portion of and inside the spheroidized natural graphite particles, the surface of the spheroidized natural graphite particles may be coated with the amorphous or semicrystalline carbon precursor, and the gap present at the surface portion of and inside the spheroidized natural graphite particles may be impregnated with the amorphous or semicrystalline carbon precursor.

The sonicated solution may be dried through a spray-drying process, such as rotary spraying, nozzle spraying, ultrasonic spraying or combinations thereof, a drying process using a rotary evaporator, a vacuum-drying process, a natural drying process or combinations thereof.

Coating of the spheroidized-natural-graphite-modified particles with the amorphous or semicrystalline carbon precursor may be further performed. Thereby, a more uniform amorphous or semicrystalline carbon coating layer may be formed on the surface of the spheroidized-natural-graphite-modified particles.

The spheroidized-natural-graphite-modified particles may be heat-treated at a temperature of 500 to 3200° C., preferably 500 to 2500° C., and more preferably 900 to 1500° C. When the heat treatment is performed within the above temperature range, heterogeneous elements, which are impurities, may be sufficiently removed during the carbonization of the amorphous or semicrystalline carbon precursor, and thus irreversible capacity may be reduced, thereby improving charge/discharge cycle characteristics.

The heat treatment may be carried out in an atmosphere containing nitrogen, argon, hydrogen or combinations thereof, or in a vacuum.

The heat treatment enables carbonization of the amorphous or semicrystalline carbon precursor present in the gap between the flaky natural graphite fragments at the surface portion of and inside the spheroidized natural graphite particles and present on the surface of the spheroidized natural graphite, whereby the surface of the spheroidized natural graphite particles may be coated with the amorphous or semicrystalline carbon and the amorphous or semicrystalline carbon may be present in the gap formed at the surface portion of and inside the spheroidized natural graphite particles.

When the spheroidized-natural-graphite-modified composite particles thus manufactured are used as the anode active material, reactivity with the electrolyte may increase, thus realizing a lithium secondary battery having superior high-rate charge and discharge characteristics, superior cycle life characteristics, and high energy density.

Specifically, when an anode is manufactured using the spheroidized natural graphite particles as the anode active material, pressing of the spheroidized natural graphite particles may occur due to the compression process. In particular, in the case in which a gap is formed between the M flaky natural graphite fragments of the spheroidized natural graphite particles through sonication, pressing due to the compression process may occur more severely. However, according to an embodiment of the present invention, sonication enables impregnation of the gap between the flaky natural graphite fragments with the amorphous or semicrystalline carbon precursor and coating of the surface of the spheroidized natural graphite with the amorphous or semicrystalline carbon precursor, and subsequent heat treatment enables the surface of the spheroidized natural graphite particles to be coated with the amorphous or semicrystalline carbon and the amorphous or semicrystalline carbon to be present in the gap formed at the surface portion of and inside the spheroidized natural graphite particles, thus impeding the pressing of the spheroidized natural graphite particles to thereby manufacture a high-density electrode. Accordingly, because of high reactivity with the electrolyte, the high-rate charge and discharge characteristics of the lithium secondary battery including the high-density electrode may be improved.

Meanwhile, in the case in which the amorphous or semicrystalline carbon is applied only on the surface of the spheroidized natural graphite particles, it is difficult to effectively buffer the repeated expansion and contraction of graphite when repeating intercalation and deintercalation of lithium during charging and discharging, whereby the structured state of the flaky natural graphite fragments that constitute the spheroidized natural graphite particles becomes loose, the inside of the spheroidized natural graphite particles is exposed to the electrolyte and thus the electrolyte penetrates therein, and an irreversible reaction may occur, additionally forming an SEI film. Accordingly, charge and discharge efficiency may decrease after repeated charge and discharge cycles, swelling of spheroidized natural graphite particles may occur, and structural stability may be deteriorated.

In an embodiment of the present invention, the surface of the spheroidized natural graphite particles is coated with the amorphous or semicrystalline carbon, and the amorphous or semicrystalline carbon is present in the gap formed at the surface portion of and inside the spheroidized natural graphite particles, whereby the flaky natural graphite fragments constituting the spheroidized natural graphite particles may be linked to each other. Thus, the structure of the spheroidized natural graphite particles may be maintained stable even when repeating intercalation and deintercalation of lithium during charging and discharging, and physical and electrical contact is maintained between the flaky natural graphite fragments present in the spheroidized natural graphite particles, thereby improving electrical conductivity.

In addition, the present invention pertains to a lithium secondary battery including an anode including the anode active material, a cathode and an electrolyte.

Lithium secondary batteries may be classified into lithium ion batteries, lithium ion polymer batteries and lithium polymer batteries depending on the kinds of separator and electrolyte that are used, into cylindrical, angular, coin, and pouch batteries, etc. depending on the shape thereof, and into bulk-type and thin-film-type batteries depending on the size thereof. Since the configurations and manufacturing methods of such batteries are well known in the art, a detailed description thereof will be omitted.

The anode may be manufactured by mixing the aforementioned anode active material, a binder, and optionally a conductor to afford a composition for an anode active material layer, which is then applied on an anode current collector, and the anode configuration is well known in the art, and thus a detailed description thereof will be omitted.

A better understanding of the present invention will be given through the following examples, which are merely set forth to illustrate the present invention but are not to be construed as limiting the scope of the present invention, and are provided to more fully describe the present specification to those skilled in the art.

Manufacture of Anode Active Material

Example 1

Spheroidized natural graphite particles (POSCO Chemtech, SNG16) having an average particle diameter (D50) of 16 μm were added to water containing 0.175% hydrogen peroxide to afford a mixed solution, after which the mixed solution was mixed using a stirrer, and simultaneously, sonicated at a frequency of 20 kHz and a power of 55 W for 30 min, and then heat-treated at 1200° C. for 1 hr in an argon atmosphere.

Example 2

Spheroidized natural graphite particles (POSCO Chemtech, SNG16) having an average particle diameter (D50) of 16 μm were added to water containing 3.45% hydrogen peroxide to afford a mixed solution, after which the mixed solution was mixed using a stirrer, and simultaneously, sonicated at a frequency of 20 kHz and a power of 55 W for 30 min, and then heat-treated at 1200° C. for 1 hr in an argon atmosphere.

Example 3

Spheroidized natural graphite particles (POSCO Chemtech, SNG16) having an average particle diameter (D50) of 16 μm and 10 wt % of PVP based on the amount of the spheroidized natural graphite were added to water containing 0.175% hydrogen peroxide to afford a mixed solution, after which the mixed solution was mixed using a stirrer, and simultaneously, sonicated at a frequency of 20 kHz and a power of 55 W for 30 min, and then subjected to rotary spray drying at 150° C., thus manufacturing graphite-modified particles. The spheroidized-natural-graphite-modified particles thus dried were subjected to additional surface coating using a petroleum-based pitch (after carbonization, the amount of amorphous or semicrystalline carbon was 7 parts by weight based on 100 parts by weight of the spheroidized natural graphite particles), heat-treated at 1200° C. for 1 hr in an argon atmosphere, and furnace-cooled, thereby manufacturing graphite-modified composite particles.

Comparative Example 1

Spheroidized natural graphite particles (POSCO Chemtech, SNG16) having an average particle diameter (D50) of 16 μm were added to water to afford a mixed solution, after which the mixed solution was mixed using a stirrer, and simultaneously, sonicated at a frequency of 20 kHz and a power of 55 W for 30 min, and then heat-treated at 1200° C. for 1 hr in an argon atmosphere.

Comparative Example 2

Spheroidized natural graphite particles (POSCO Chemtech, SNG16) having an average particle diameter (D50) of 16 μm and 10 wt % of PVP based on the amount of the spheroidized natural graphite were added to water to afford a mixed solution, after which the mixed solution was mixed using a stirrer, and simultaneously, sonicated at a frequency of 20 kHz and a power of 55 W for 30 min, and then subjected to rotary spray drying at 150° C., thus manufacturing graphite-modified particles. The spheroidized-natural-graphite-modified particles thus dried were subjected to additional surface coating using a petroleum-based pitch (after carbonization, the amount of amorphous or semicrystalline carbon was 7 parts by weight based on 100 parts by weight of the spheroidized natural graphite particles), heat-treated at 1200° C. for 1 hr in an argon atmosphere, and furnace-cooled, thereby manufacturing graphite-modified composite particles.

Evaluation 1: SEM Analysis of Anode Active Material

Figure 2:
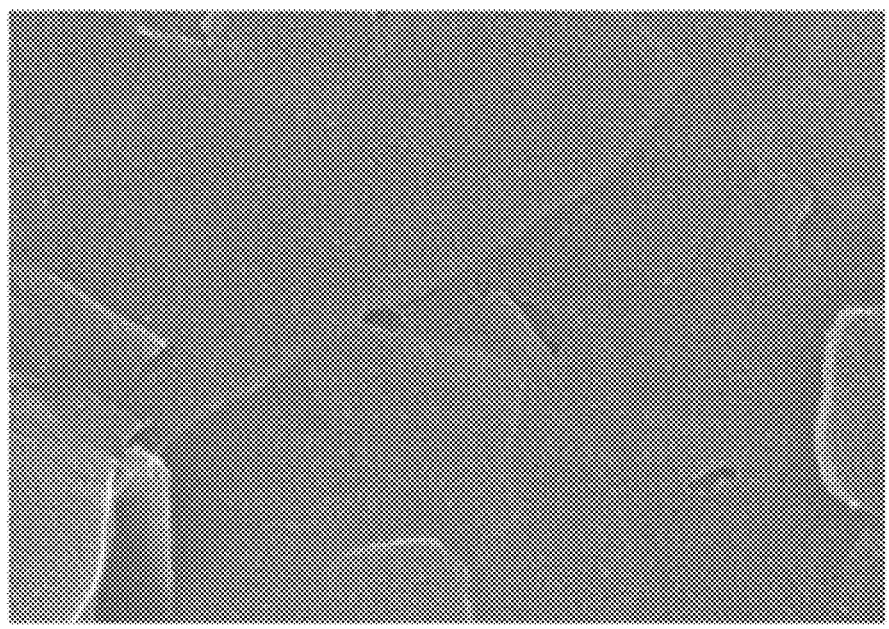
FIG. 2 shows a scanning electron microscope (SEM) image of the surface of spheroidized natural graphite of Example 1.
Figure 3:
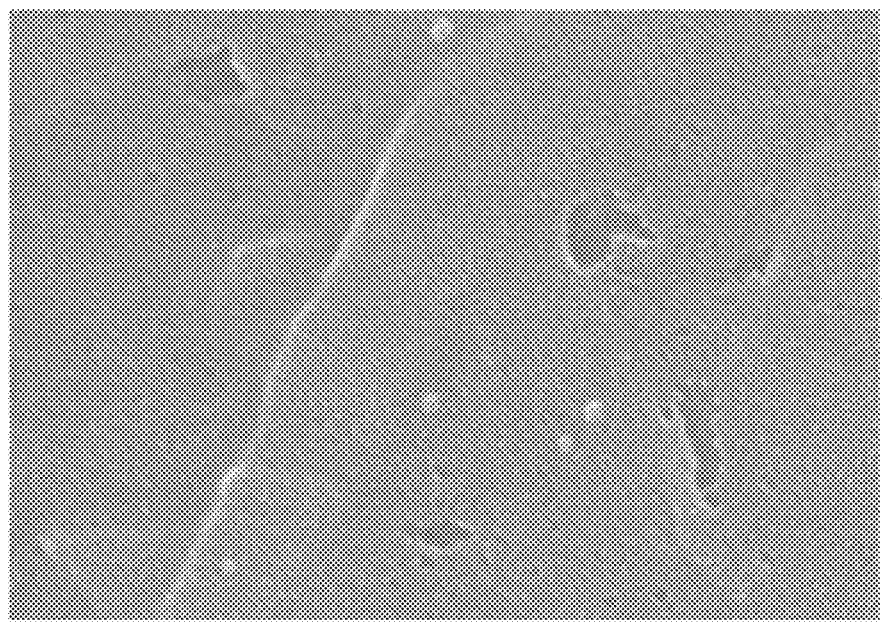
FIG. 3 shows an SEM image of the surface of spheroidized natural graphite of Example 2.
Figure 4:
FIG. 4 shows an SEM image of the surface of spheroidized natural graphite of Comparative Example 1.

FIGS. 2, 3 and 4 are SEM images showing the surface of spheroidized natural graphite manufactured in Example 1, Example 2 and Comparative Example 1.

With reference to FIGS. 2 to 4, the spheroidized natural graphite of Example 1 and Example 2 was configured such that defects were formed on the surface of the spheroidized natural graphite particles, and the size and amount of the defects were increased with an increase in the concentration of hydrogen peroxide. In contrast, in Comparative Example 1, in which sonication was performed in the solution containing no hydrogen peroxide, defects were not observed on the surface of the spheroidized natural graphite particles, and a smooth surface appeared.

Evaluation 2: Raman Analysis

Figure 5:
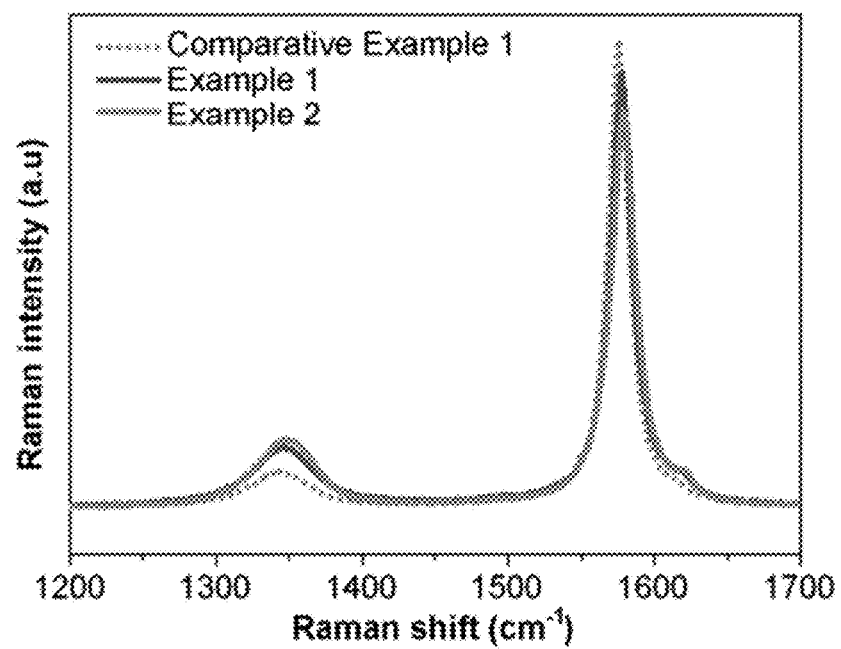
FIG. 5 shows the results of Raman analysis of spheroidized natural graphite of Example 1, Example 2 and Comparative Example 1.

FIG. 5 shows the results of Raman analysis of the spheroidized natural graphite manufactured in Examples 1 and 2 and Comparative Example 1. In Examples 1 and 2, in which sonication was performed in the solution containing hydrogen peroxide, R-values were 0.1390 and 0.1774, which were slightly higher than 0.0583 of Comparative Example 1, in which sonication was performed in the solution containing no hydrogen peroxide. This is deemed to be because crystallinity was lowered due to the formation of defects on the surface of the spheroidized graphite particles.

(Manufacture of Test Cell)

The anode active material manufactured in each of Example and Comparative Example 2 was mixed with CMC/SBR (carboxymethyl cellulose/styrene-butadiene rubber) at a weight ratio of 96:4 in distilled water, thus preparing an anode slurry. The anode slurry was applied on a piece of copper foil, dried, and compressed, thereby manufacturing an anode.

A separator composed of a porous polypropylene film was interposed between the anode and lithium metal serving as a counter electrode and stacked, thus manufacturing an electrode assembly. Thereafter, an electrolyte in which 1 M $LiPF_6$ was dissolved in a solvent mixture (DEC:EC=1:1) of diethyl carbonate (DEC) and ethylene carbonate (EC) was added thereto, thereby manufacturing a test cell (coin-type cell CR-2016).

Evaluation 3: Analysis of High-Rate Charge Characteristics

The high-rate charge characteristics of Example 3 and Comparative Example 2 were evaluated through the following method using the test cell manufactured above. The results are shown in Table 1 below.

The test cell manufactured using each of Example 3 and Comparative Example 2 was charged at a current density ranging from 0.2 to 2 C-rate in a CC/CV mode, and a final voltage was maintained at 0.01 V. Also, discharging was performed at a current density of 0.2 C-rate in a CC mode, and a final voltage was maintained at 1.5 V.

As is apparent from Table 1 below, in Example 3 using the anode active material manufactured through sonication in the solution containing hydrogen peroxide, superior high-rate charge characteristics were exhibited compared to Comparative Example 2 using the anode active material manufactured through sonication in the solution containing no hydrogen peroxide.

Evaluation 4: Analysis of High-Rate Charge and Discharge Characteristics

The high-rate discharge characteristics of Example 3 and Comparative Example 2 were evaluated through the following method using the test cell manufactured above. The results are shown in Table 1 below.

The test cell manufactured using each of Example 3 and Comparative Example 2 was charged at a current density of 0.2 C-rate in a CC/CV mode, a final voltage was maintained at 0.01 V, and charging was terminated when the current was 0.02 C-rate. Also, discharging was performed at a current density ranging from 0.2 C-rate to 10 C-rate in a CC mode, and a final voltage was maintained at 1.5 V.

As is apparent from Table 1 below, in Example 3 using the anode active material manufactured through sonication in the solution containing hydrogen peroxide, superior high-rate charge and discharge characteristics were exhibited compared to Comparative Example 2 using the anode active material manufactured through sonication in the solution containing no hydrogen peroxide.

The superior high-rate charge and discharge characteristics of the anode active material manufactured through sonication in the solution containing hydrogen peroxide are deemed to be due to defects formed on the surface of the spheroidized natural graphite particles during the sonication.

TABLE 1

| No. | High-rate charge characteristics Charge capacity (mAh/g) | | | High-rate discharge characteristics Discharge capacity (mAh/g) | | | | | |
|---|---|---|---|---|---|---|---|---|---|
| | 0.2 C | 1 C | 2 C | 0.2 C | 1 C | 2 C | 5 C | 7 C | 10 C |
| Example 3 | 351.2 | 307.5 | 273.2 | 357.8 | 357.2 | 356.9 | 353.5 | 349.8 | 329.2 |
| Comparative Example 2 | 346.6 | 298.7 | 251.3 | 355.2 | 355.1 | 354.2 | 340.7 | 320.2 | 290.8 |

Although the preferred embodiment of the present invention has been disclosed for illustrative purposes, those skilled in the art will appreciate that various modifications, additions and substitutions are possible without departing from the scope and spirit of the invention as disclosed in the accompanying claims. Thus, the embodiments described above should be understood to be non-limiting and illustrative in every way.

What is claimed is:

1. An anode active material for a lithium secondary battery, the anode active material comprising:
   natural graphite particles configured such that flaky natural graphite fragment particles having uneven surface defects are structured at random and granulated, a surface and an inside of the natural graphite particles including a gap formed between the flaky natural graphite fragment particles; and
   a coating layer including amorphous or semicrystalline carbon formed on a surface of the flaky natural graphite fragment particles that form the gap and the surface of the natural graphite particles,
   wherein the uneven surface defects comprise nanochannels or cavities having recesses of nano-scale dimensions and wherein the nanochannels or cavities are formed on the surface of each of the flaky natural graphite fragment particles.

2. The anode active material of claim 1, wherein the amorphous or semicrystalline carbon is included in an amount of 1 to 20 parts by weight based on 100 parts by weight of the natural graphite particles.

3. The anode active material of claim 1, wherein the natural graphite particles have an average particle diameter (D50) of 5 to 40 µm.

4. The anode active material of claim 1, wherein at least two of the flaky natural graphite fragment particles comprise recesses of different shapes, depths, widths, and lengths.

5. The anode active material of claim 1, wherein at least one of the flaky natural graphite fragment particles comprises two or more recesses having different shapes and depths.

6. A method of manufacturing the anode active material of claim 1, the method comprising:
   preparing a solution, including spheroidized natural graphite particles in which flaky natural graphite fragment particles are structured at random and granulated, an amorphous or semicrystalline carbon precursor, an oxidizing agent, and a solvent;

sonicating the solution, whereby a gap is formed between the flaky natural graphite fragment particles present at a surface of and inside the spheroidized natural graphite particles, uneven defects are formed on a surface of the flaky natural graphite fragment particles present at the surface of and inside the spheroidized natural graphite particles, and the surface of the flaky natural graphite fragment particles forming the gap and the surface of the spheroidized natural graphite particles are impregnated and coated with the amorphous or semicrystalline carbon precursor;

drying the sonicated solution, thus manufacturing spheroidized-natural-graphite-modified particles; and heat-treating the spheroidized-natural-graphite-modified particles.

7. The method of claim 6, wherein the carbon precursor is at least one selected from the group consisting of citric acid, stearic acid, sucrose, polyvinylidene fluoride, a Pluronic block copolymer (Pluronic F127), carboxymethyl cellulose (CMC), hydroxypropyl cellulose, regenerated cellulose, polyvinylpyrrolidone, tetrafluoroethylene, polyethylene, polypropylene, an ethylene-propylene-diene monomer (EPDM), sulfonated EPDM, starch, a phenol resin, a furan resin, furfuryl alcohol, polyacrylic acid, sodium polyacrylate, polyacrylonitrile, polyimide, an epoxy resin, cellulose, styrene, polyvinylalcohol, polyvinyl chloride, polyvinyl pyrrolidone, glycerol, polyol, a coal-based pitch, a petroleum-based pitch, a mesophase pitch, low-molecular-weight heavy oil, glucose, gelatin and sugars.

8. The method of claim 6, wherein the solvent is at least one selected from the group consisting of water, N-methylpyrrolidone, dimethylformamide, toluene, ethylene, dimethylacetamide, acetone, methyl ethyl ketone, hexane, tetrahydrofuran, decane, ethanol, methanol, isopropanol, and ethyl acetate.

9. The method of claim 6, wherein the sonicating is performed at a frequency of 10 to 35 kHz and an ultrasonic amplitude of 10 to 100 W for 1 min to 24 hr.

10. The method of claim 6, wherein the drying is performed through at least one spray-drying process selected from among rotary spraying, nozzle spraying and ultrasonic spraying, a drying process using a rotary evaporator, a vacuum-drying process, or a natural drying process.

11. The method of claim 6, wherein the oxidizing agent includes at least one selected from among hydrogen peroxide ($H_2O_2$), nitric acid ($HNO_3$), sulfuric acid ($H_2SO_4$), potassium permanganate ($KMnO_4$) and sodium hydroxide (NaOH).

12. The method of claim 6, wherein the heat-treating is performed at 500 to 3200° C.

13. The method of claim 6, wherein the heat-treating is performed in an atmosphere containing nitrogen, argon, hydrogen or combinations thereof, or in a vacuum.

14. The method of claim 6, wherein the carbon precursor is included in an amount of 2 to 80 parts by weight based on 100 parts by weight of the spheroidized natural graphite particles.

15. A lithium secondary battery, comprising:
an anode including the anode active material of claim 1;
a cathode; and
an electrolyte.

* * * * *